Sept. 13, 1966 W. B. HANSEL 3,272,598
WAVE REACTOR

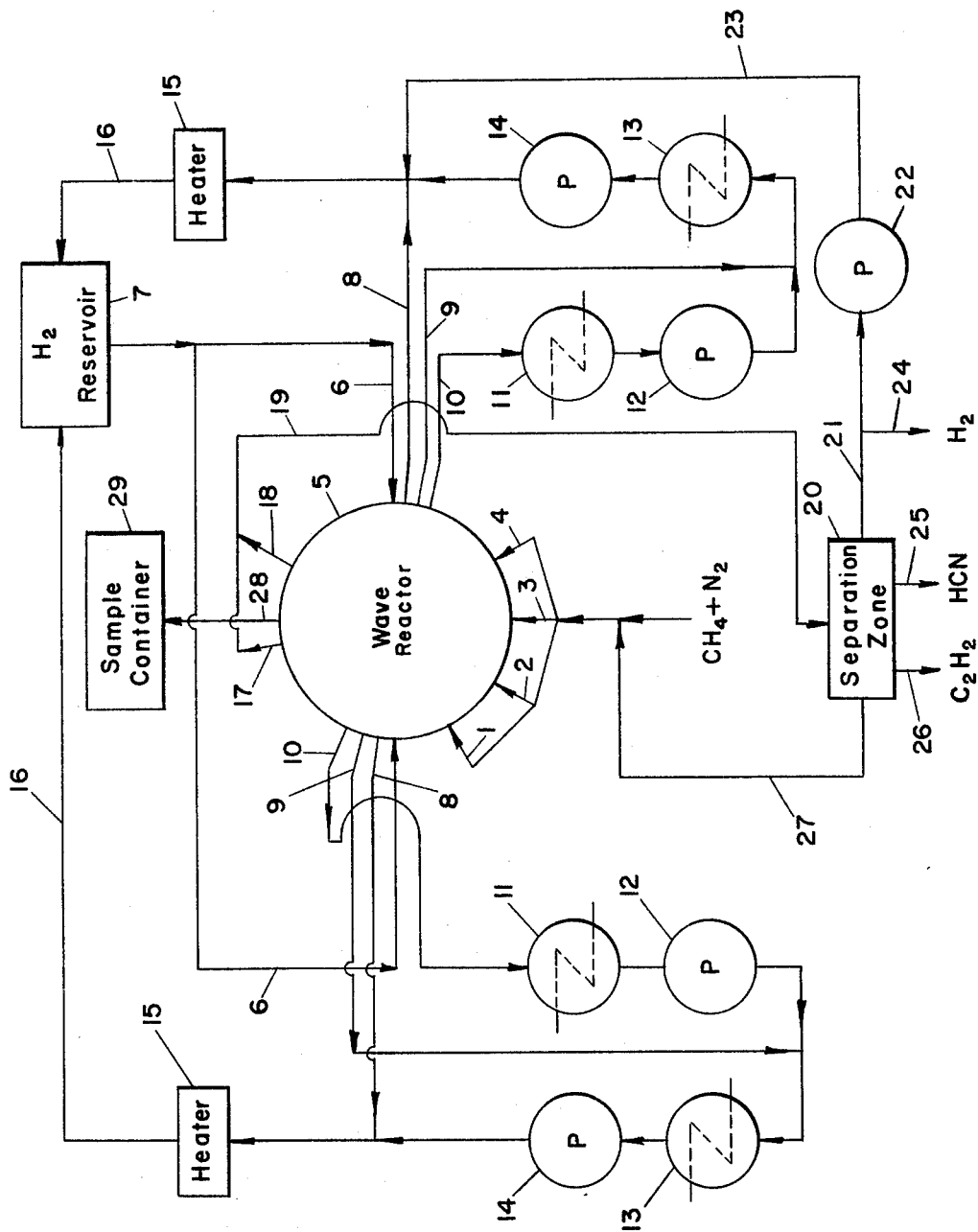

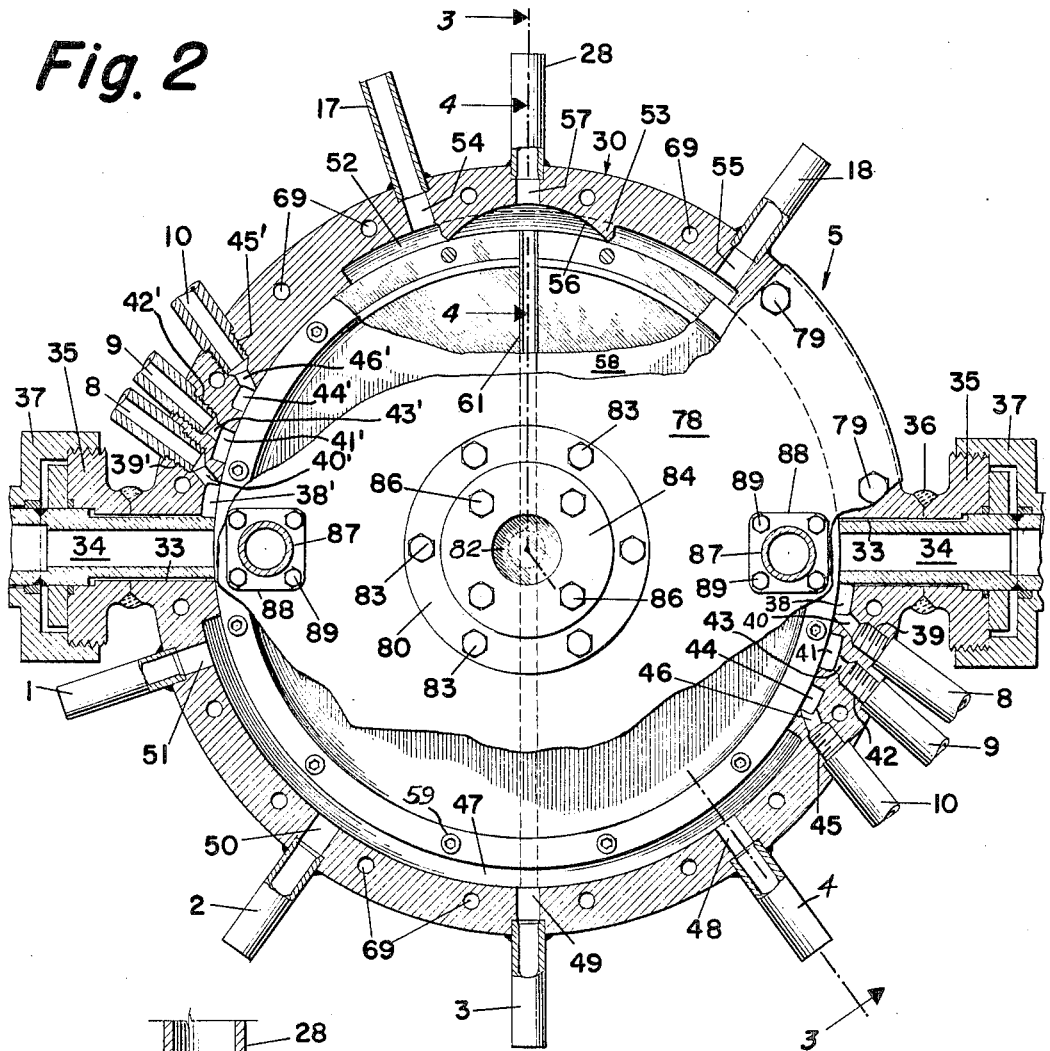
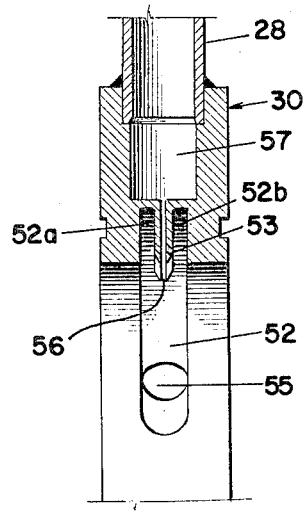

Filed March 9, 1964 3 Sheets-Sheet 3

INVENTOR.
WILLIAM B. HANSEL
BY George L. Church
ATTORNEY

# United States Patent Office 3,272,598
Patented Sept. 13, 1966

3,272,598
WAVE REACTOR
William B. Hansel, Media, Pa., assignor to Sun Oil Company, Philadelphia, Pa., a corporation of New Jersey
Filed Mar. 9, 1964, Ser. No. 350,463
5 Claims. (Cl. 23—284)

This invention relates to a wave reactor for carrying out chemical reactions of the endothermic type. Such reactions may be carried out by subjecting the reactants to one or more mechanical shock waves, thereby to produce a high temperature in such reactants for a very short period of time.

In various chemical reactions, it is necessary that very high temperatures be employed and that the residence time of the reactants at the elevated temperature be very short. An example of such a reaction is the production of acetylene and hydrogen cyanide by the reaction of methane and nitrogen, as exemplified by the following chemical equations:

$$2CH_4 \rightarrow C_2H_2 + 3H_2$$

and $$2CH_4 + N_2 \rightarrow 2HCN + 3H_2$$

For these equations, which may in effect be though of as a single reaction, to proceed, it is necessary that very rapid heating of the reactants from a temperature not greater than 900° F. to a temperature not less than 3200° F. be accomplished. The maintenance of the reactants too long at temperatures in the range of 900° to 3200° F. results in excessive reaction, producing undesired products such as carbon.

It is therefore necessary that the heating through this crucial range be extremely rapid. It is also necessary that upon reaching the reaction temperature, which is for example in the range of 3200° to 4000° F., the reactants be maintained at such temperature for only a short time. It is further necessary that the reaction products be rapidly cooled from the reaction temperature to a temperature not substantially greater than 1600° F.

The present invention provides a wave reactor of novel structure, which as capable of producing rapid heating and cooling and which is therefore highly satisfactory for use in carrying out various chemical reactions which require rapid heating and cooling. The wave reactor of this invention has superior efficiency and attains the necessary high temperatures, while avoiding operating problems which have beset prior art wave reactors.

The objects of this invention are accomplished, briefly, in the following manner: A straight elongated shock tube rotates in a vertical plane within a port ring having arcuately-elongated grooves in its inner cylindrical surface. These grooves provide gas inlet and outlet areas (for feeding gases to and from the shock tube) and also act as manifolds, with which outlet pipes or conduits communicate for conveying gases toward and away from the port ring. A separate groove, whose cross-sectional area is very small compared to that of the other grooves, provides a sampling area; a separate pipe or conduit communicates with this last-mentioned groove for conveying a gaseous sample away from the port ring.

A detailed description of the invention follows, taken in conjunction with the accompanying drawings, wherein:

FIG. 1 is a schematic flow diagram of a wave reactor system set up for the preparation of hydrogen cyanide and acetylene from methane and nitrogen;

FIG. 2 is a front elevation of the wave reactor of this invention, certain parts being peeled away to show the interior thereof;

FIG. 4 is a partial vertical section through the port ring, taken on line 4—4 of FIG. 2 and drawn on an enlarged scale.

Figure 3:
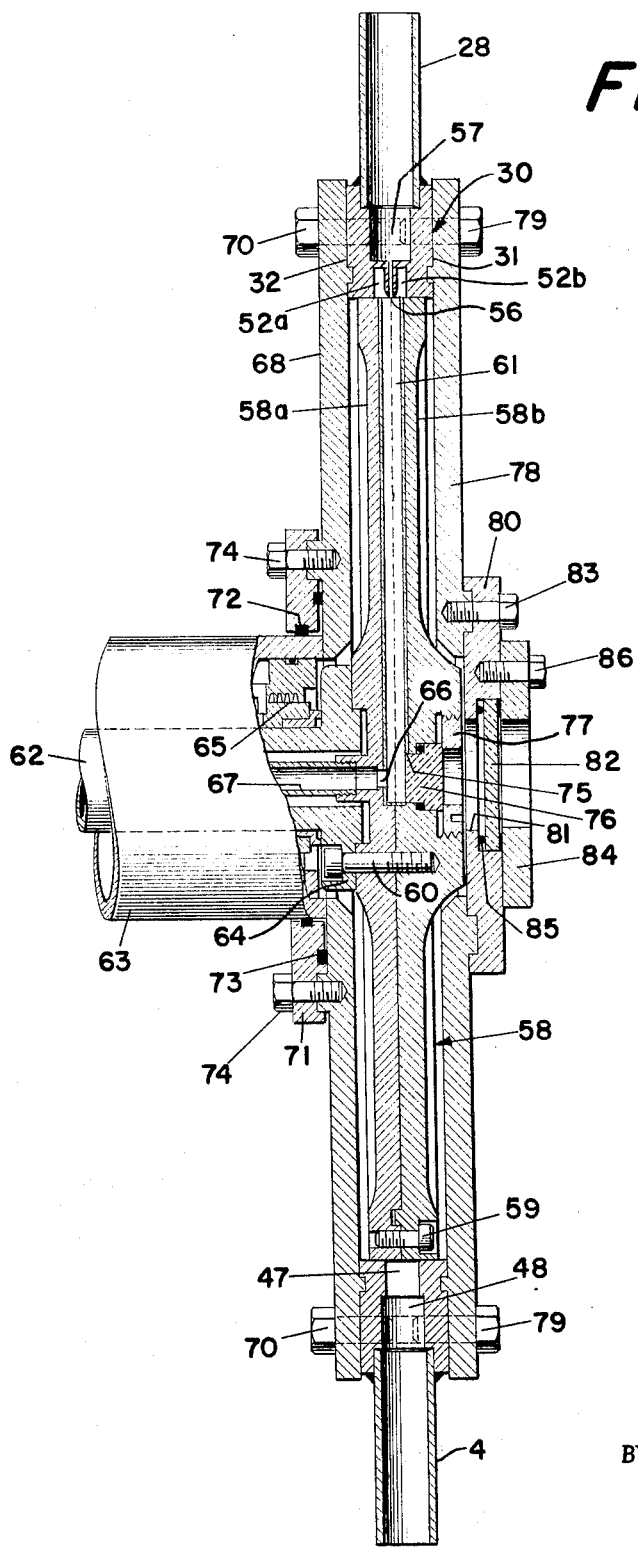
FIG. 3 is an essentially vertical section, taken on line 3—3 of FIG. 2.

It has been found that it is possible to convert natural gas (methane) into acetylene, or mixtures of natural gas and nitrogen into hydrogen cyanide and acetylene, by heating the reagents quickly to temperatures above 3500° F., the heating to be almost immediately followed by cooling to a temperature not substantially greater than 1600° F., the cooling rate being comparable to the heating rate. More specifically, a mixture of equal parts by volume of nitrogen and methane can be converted to a mixture consisting of acetylene, hydrogen cyanide, hydrogen, nitrogen, and methane, at a low power plus heat cost and with good yields of acetylene, hydrogen cyanide, and by-product hydrogen. The reactions are essentially of the type expressed in the chemical equations set forth previously.

The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. That is to say, the process involves adiabatic compression of the process gas by another gas, the driving gas, which latter works in a way similar to a mechanical piston. The adiabatic compression is the result of a shock wave produced in the tube.

The heating is followed almost immediately by rapid cooling through expansion. If there is a sequence of equivalent independent shock tube processes, the result is essentially a continuous flow process.

The gas or mixture of gases which is acted upon in the shock tube may be termed the reagents, a process gas, a reactant mixture, a charge gas, a reactant material, or a process mixture.

Referring now to FIG. 1, a mixture of equal parts by volume of nitrogen and methane (natural gas), at atmospheric pressure and about 890° F., is introduced through the manifolded conduits 1, 2, 3, and 4 into the reaction tube (shock tube) of a wave reactor 5, which is of generally circular configuration. This introduction of reactant material begins a cycle of operation of the wave reactor. Both the inner and outer ends of conduits 1–4 are manifolded together, as will be described more fully hereinafter. As subsequentially more fully described, one side of the wave reactor receives reactant material, diametrically-opposite sides receive driving gas, from diametrically-opposite sides driving gas is withdrawn, from one side reaction products are withdrawn, and from this latter side a product sample is also withdrawn. The same numerals are employed at diametrically-opposite sides to designate conduits and apparatus which correspond in function. It is to be understood that in many cases a single piece of apparatus can be substituted for the corresponding two pieces of apparatus having the same function, and in this case certain materials introduced into and withdrawn from the wave reactor (to wit, the driving gas) can be suitably manifolded to the substituted single piece of apparatus. However, for purposes of clarity, the respective pieces of apparatus are duplicated at diametrically-opposite sides of the wave reactor.

Following the introduction of reactant material, a driving gas, for example hydrogen at about twenty-two atmospheres absolute and 1040° F., is suddenly introduced through the lines 6 from a hydrogen reservoir 7 into diametrically-opposite sides of the wave reactor 5. Shock waves are thereby created in the reaction tube of the wave reactor. The methane and nitrogen (assumed"

to be already in the reaction tube) are adiabatically compressed, with resulting rapid increase in temperature (to a temperature above 3500° F.). At this rather high reaction temperature, the methane and nitrogen react to form hydrogen cyanide and acetylene, with hydrogen as a by-product, as indicated by the chemical equations set out previously.

After the adiabatic compression process is complete, a portion of the driving gas is removed from diametrically-opposite sides of the wave reactor through the lines 8, at about twenty-two atmospheres and 1090° F. Subsequently, a second portion of the driving gas is withdrawn from diametrically-opposite sides of the wave reactor through the lines 9, at about seven atmospheres and 645° F. Subsequently, the remainder of the driving gas is withdrawn from diametrically-opposite sides of the wave reactor through the lines 10, at about two atmospheres and 330° F.

The last portion of the driving gas is cooled by passage through coolers 11 to reduce the temperature to about 140° F. This portion of the driving gas is then compressed to about seven atmospheres by passage through compressors 12. The resulting driving gas is admixed with the driving gas removed through line 9, and the mixture is cooled in coolers 13 to a temperature of about 140° F. The cooled gas is compressed in compressors 14 to about twenty-two atmospheres, and is admixed with the driving gas removed through line 8. The mixture is introduced into the heaters 15, wherein it is heated to about 1040° F. The heated driving gas at about twenty-two atmospheres is supplied through lines 16 to the reservoir 7.

Following the removal of the driving gas from the respective opposite sides of the wave reactor, the reaction products, together with unreacted methane and nitrogen, are withdrawn from the wave reactor through the manifolded conduits 17 and 18, as effluent gas, at about 1540° F. and 0.5 atmosphere. Both the inner and outer ends of conduits 17 and 18 are manifolded together, as will be described more fully hereinafter. The material withdrawn via line 19 (to which the outer ends of conduits 17 and 18 are manifolded) is introduced into a separation zone 20 wherein a plurality of operations are carried out to obtain the respective constituents in purified form. Hydrogen, which was formed in the aforementioned chemical reactions, is separated by known means, such as diffusion through a palladium tube, and is removed through line 21. A portion of the removed hydrogen can be compressed in the compressor 22 to about twenty-two atmospheres and introduced through the line 23 into one of the heaters 15, for subsequent use in another cycle in the wave reactor operation. The remainder of the product hydrogen is withdrawn via line 24 as a product of the process.

Hydrogen cyanide is separated from the remaining product gases by scrubbing with an alkaline medium, or by other known separation procedures. This gas is withdrawn via line 25 as another product of the process. After separation of the hydrogen cyanide, acetylene is separated from the remaining gases by absorption in a copper-salt solution, or by other known means for separating acetylene from gaseous mixtures. Acetylene is withdrawn via line 26 as another product of the process. The remaining (unreacted) methane and nitrogen are recycled to the wave reactor 5 through line 27, which couples into the feed line for conduits 1–4.

At a location between the manifold product conduits 17 and 18, a product sample is abstracted from the wave reactor by means of a sample conduit 28, and is fed to a sample container 29 of any suitable form. The arrangement of this sample coupling will be described in detail hereinafter.

Consider now that a straight open-ended tube, having a length substantially equal to the diameter of the circle at 5, is rotating in a clockwise direction (at high angular velocity) in the plane of the paper, about an axis coinciding with the center of the circle. The ends of such a tube would thus rotate past the ends of the various lines and conduits shown schematically in FIG. 1. As one end of the tube rotates past the ends of conduits 1–4 to begin a cycle of operation, process gas is admitted to the tube. At this same time, the other end of the tube may be rotating past the ends of conduits 17 and 18, and also conduit 28, thereby discharging product gas (and product sample) from the tube. When the opposite ends of the tube thereafter come into alignment with the ends of lines 6, both ends of the tube are thereby suddenly connected to the reservoir 7, which contains the high pressure driving gas, hydrogen. The hydrogen enters the tube with high velocity from both ends, creating two shock waves which push the process gas (already in the tube) toward the middle. This adiabatic compression compresses the process gas and brings it very rapidly to the reaction temperature, not less than 3200° F. The two shock waves, emanating from the two tube ends, eventually meet in the middle and cross. When the two shock waves have traveled through the entire tube length, the compression process is complete.

After completion of the compression process, the tube contains a charge of process (now product) gas and hydrogen at high pressure, with both tube ends being closed (since, by this time, the ends of the tube have completed their travel past the ends of lines 6). Specifically, when the compression process is complete, the tube contains, for every pound of process gas, 2.2 lbs. of hydrogen at a pressure of forty atmospheres. The product gas is at 3200° F., the hydrogen at 1380° F. The flow speed reached in the tube is 5600 ft. per second, corresponding to Mach numbers of 0.82 and 1.86 for the hydrogen and the process gas, respectively.

Following the compression process, both ends of the tube come into alignment wtih the ends of lines 8; this means that both tube ends simultaneously become open to spaces of a pressure below the pressure in the tube. Now, hydrogen begins to flow out of the tube, setting up expansion waves which emanate from the respective ends of the tube. The expansion described begins to rapidly reduce the temperature and pressure of the product gas. The two expansion waves, emanating from the two tube ends, eventually meet in the middle and cross. When the two expansion waves have traveled through the entire tube length, the first expansion process is complete.

After completion of the first expansion process, the tube contains the original quantity of product gas, plus a fraction of the hydrogen which originally entered the tube; these contents are at a reduced pressure. At this point, both tube ends are closed, the ends of the tube having completed their travel past the ends of lines 8.

The expansion process described is repeated two more times, the tube ends being opened each time to spaces of progressively lower pressure (to wit, first the ends of lines 9 and then the ends of lines 10). Thus, a total of three expansion stages are employed. At the end of the third expansion stage, all the hydrogen has left the tube.

For a more detailed explanation of the compression and expansion processes, reference may be had to my copending application, Serial No. 326,009, filed Nov. 26, 1963.

After the third expansion stage, there is an expansion and discharge stage, during which effluent gas is discharged; this expansion and discharge occurs during the time that one end of the tube is in communication with the ends of conduits 17 and 18 and 28, and will be described in more detail hereinafter. The cooling of the effluent gas from 3200° F. to about 1500° F. involves a pressure decrease of 80:1. Thus, the final effluent gas pressure at the end of this last-mentioned stage is 0.5 atmosphere. At the same time that one end of the tube is in communication with the ends of conduits 17, 18, and 28, process gas may be entering the other end of the tube, via conduits 1–4, to begin the next cycle of operation of the wave reactor.

A detailed description of the construction of wave reactor 5 will now be given, with reference to FIGS. 2–4. A stationary port ring 30 is mounted in a position wherein its longitudinal axis extends substantially horizontally, and its two parallel annular faces (to wit, its front and rear faces 31 and 32, respectively, see FIG. 3) lie in parallel vertical planes. By way of example, port ring 30 may have a thickness in the axial direction of one inch, an I.D. of twelve inches, and an O.D. of 14½ inches. Ring 30 has therein a pair of diametrically-opposite, radially-extending apertures 33 which are centered on the respective opposite ends of its central horizontal diameter. Apertures 33 are approximately rectangular in outline, but have arcuate upper and lower boundaries. The longer dimension (e.g., this may be 1⅜ inches) of these approximately rectangular apertures 33 extends vertically in the plane of the paper in FIG. 4. Apertures 33 are the apertures for the driving gas (hydrogen) supply nozzles.

In each of the apertures 33 there is slidably mounted a respective nozzle 34. These nozzles have at their inner ends a rectangular cross-section with inside dimensions about ¼ inch by 1 inch, they open into the interior of the port ring 30, and they are cut off at their inner ends on a twelve-inch diameter arc, to match the curvature of the I.D. of ring 30. Toward their outer ends, each of the nozzles 34 is provided with a respective mechanical assembly which enables the nozzles to be adjusted longitudinally, in their respective apertures 33, over a small range (e.g., .01 inch). Such assemblies are not shown completely herein, since they form no part of the present invention; they are disclosed and claimed in my copending application, Ser. No. 334,523, filed Dec. 30, 1963. Such assemblies may each include an externally-threaded flange 35 secured as by welding at 36 to the outer face of ring 30, and a housing 37 having female threads at one end hereof which mate with the threads of flange 35.

The outer ends of nozzles 34 are coupled to respective ones of the lines 6 (see FIG. 1), which in turn extend to the hydrogen (driving gas) reservoir 7. Thus, by means of the nozzles 34, the driving gas is fed to diametrically-opposite areas of the interior of ring 30, that is, the diametrically-opposite sides of the wave reactor.

Immediately adjacent the right-hand one of the apertures 33, in the clockwise direction (when looking at the wave reactor from the front thereof, as in FIG. 2), a pocket or recess 38 is cut into the inner cylindrical surface of ring 30, this pocket, like apertures 33, being centered along the axial dimension of ring 30. From the outer face of ring 30, closely adjacent the location of recess 38, a tapped hole 39 extends into ring 30 to a certain depth, and from the bottom of hole 39 a hole 40 extends into communication with recess 38. Thus, the combination of items 38, 40, and 39 provides a port which extends entirely through ring 30, in approximately radial direction, from the interior to the exterior thereof. One of the lines 8 has a threaded fitting on its inner end which threads into tapped hole 39; the opposite end of this line 8 is coupled into the line leading into one of the heaters 15, as previously described in connection with FIG. 1. This line 8 thus serves as a first-stage coupling for removing driving gas from the interior ring 30, at one side of the wave reactor (to wit, the right-hand side in FIG. 2).

Diametrically opposite to pocket or recess 38, a similar pocket 38′ is cut into the inner surface of ring 30, this latter pocket communicating by way of a hole 40′ with the inner end of a tapped hole 39′ into which threads a threaded fitting provided on the inner end of the other line 8. The combination of items 38′, 40′, and 39′ provides a port which extends entirely through ring 30, in an approximately radial direction, diammetrically opposite to the port provided by 38, 40, and 39. The remote end of this other line 8 is coupled into the intake line of the other heater 15, as previously described. This other line 8 thus serves as a first-stage coupling for removing driving gas from the interior of ring 30, at the other side of the wave reactor (to wit, the left-hand side in FIG. 2).

Slightly clockwise (when viewed in FIG. 2) from pocket 38, a pocket or recess 41 is cut into the inner cylindrical surface of ring 30, this pocket also being centered along the axial dimension of ring 30, and, like pocket 38, being substantially rectangular in outline. From the outer face of ring 30, closely adjacent the location of recess 41, a tapped hole 42 extends into ring 30 to a certain depth, and from the bottom of hole 42 a hole 43 extends into communication with recess 41. The combination of items 41, 43, and 42 provides a port which extends entirely through ring 30, in an approximately radial direction, from the interior to the exterior thereof. One of the lines 9 has a threaded fitting on its end which threads into tapped hole 42; the opposite end of this line 9 is coupled into the line leading into one of the coolers 13, as previously described in connection with FIG. 1. This line 9 thus serves as a second-stage coupling for removing driving gas from the interior of ring 30, at one side of the wave reactor (to wit, the right-hand side in FIG. 2).

Diametrically opposite to pocket or recess 41, a similar pocket 41′ is cut into the inner surface of ring 30, this latter pocket communicating by way of a hole 43′ with the inner end of a tapped hole 42′ into which threads a threaded fitting providing on the inner end of the other line 9. The combination of items 41′, 43′, and 42′ provides a port which extends entirely through ring 30, in an approximately radial direction, diammetrically opposite to the port provided by 41, 43, and 42. The remote end of this other line 9 is coupled into the intake line of the other cooler 13, as previously described. This other line 9 thus serves as a second-stage coupling for removing driving gas from the interior of ring 30, at the other side of the wave reactor (to wit, the left-hand side in FIG. 2).

Slightly clockwise (viewed in FIG. 2) from pocket 41, a pocket or recess 44 is cut into the inner cylindrical surface of ring 30, this pocket also being centered along the axial dimension of ring 30, and being substantially rectangular in outline. From the outer face of ring 30, closely adjacent the location of recess 44, a tapped hole 45 extends into ring 30 to a certain depth, and from the bottom of hole 45 a hole 46 extends into communication with recess 44. The combination of items 44, 46, and 45 provides a port which extends entirely through ring 30, in an approximately radial direction, from the interior to the exterior thereof. One of the lines 10 has a threaded fitting on its inner end which threads into tapped hole 45; the opposite end of the line 10 is coupled to the intake of one of the coolers 11, as previously described in connection with FIG. 1. This line 10 thus serves as a third-stage coupling for removing driving gas from the interior of ring 30, at one side of the wave reactor (to wit, the right-hand side in FIG. 2).

Diammetrically opposite to pocket or recess 44, a similar pocket 44′ is cut into the inner surface of ring 30, this latter pocket communicating by way of a hole 46′ with the inner end of a tapped hole 45′ into which threads a threaded fitting provided on the inner end of the other line 10. The combination of items 44′, 46′, and 45′ provides a port which extends entirely through ring 30, in an approximately radial direction, diammetrically opposite to the port provided by 44, 46, and 45. The remote end of this other line 10 is coupled to the intake of the other cooler 11, as previously described. This other line 10 thus serves as a third-stage coupling for removing driving gas from the interior of ring 30, at the other side of the wave reactor (to wit, the left-hand side in FIG. 2).

The intake (or reactant feed) portion of the port ring 30 (to which the reactant material feed conduits 1–4, FIG. 1, are coupled) may be considered as beginning at a point slightly clockwise (viewed in FIG. 2) from pocket 44 and extending in a clockwise direction around to a point spaced slightly in the counterclockwise direction from the left-hand nozzle aperture 33. The intake or inlet coupling, from the exterior of the ring 30 to the interior thereof, includes an arcuately-elongated groove 47 which is cut into the inner cylindrical surface of ring 30. Groove 47 is centered along the axial dimension of ring 30 and is substantially rectangular in outline. Groove 47 is continuous and uninterrupted from one end to the other, and may serve as an intake manifold or charge manifold for the wave reactor 5. To effectuate this purpose, four angularly-spaced, radially-extending holes 48, 49, 50, and 51 are drilled from the outside of ring 30 into communication with groove 47. By way of example, holes 48–51 may be spaced equiangularly along the arcuate length of groove 47. Also, the center line of hole 49 may extend vertically, as illustrated in FIG. 2. These holes are counterbored, and one of the feed conduits is welded into the counterbored portion of each respective radial hole. That is to say, the inner end of conduit 4 is welded into hole 48, the inner end of conduit 3 is welded into hole 49, the inner end of conduit 2 is welded into hole 50, and the inner end of conduit 1 is welded into hole 51. The outer ends of conduits 1–4 are manifolded together and connected to a feed line which is coupled to the source of reactant material (e.g., a mixture of methane and nitrogen), as illustrated in FIG. 1.

The gaseous reactant material is fed by lines 1–4 to the holes 48–51, by way of which it travels to groove 47 at the interior of port ring 30. Thus, the reactant feed path leads to the interior of port ring 30.

The exhaust (or product removal) portion of the port ring 30 (to which the product removal lines 17 and 18, FIG. 1, are coupled) may be considered as beginning at a point considerably clockwise (viewed in FIG. 2) from pocket 44' and extending in a clockwise direction around to a point spaced considerably in the counterclockwise direction from the right-hand nozzle aperture 33. The exhaust or outlet coupling, from the interior of the ring 30 to the exterior thereof, includes an arcuately-elongated groove 52 which is cut into the inner cylindrical surface of ring 30. Groove 52 is centered along the axial dimension of ring 30, and has an arcuate length of about 74½°. The two ends of this groove are substantially rectangular in outline, but the central portion of the groove is bifurcated by a tine element 53 (see FIGS. 3 and 4) which separates the groove into two spaced grooves 52a and 52b each having the shape of an inverted U. The central (bifurcated) portion of groove 52 may have an arcuate length of 32°, for example, bisected by the vertical center line of the ring in FIG. 2.

The two end portions of groove 52 communicate with each other in a continuous and uninterrupted manner by way of the sub-grooves 52a and 52b, and this groove may therefore serve as an exhaust manifold or "product out" manifold for the wave reactor 5. To effectuate this purpose, a radially-extending hole 54 is drilled from the outside of ring 30 into communication with the counterclockwise end portion of groove 52, and a radially-extending hole 55 is drilled from the outside of ring 30 into communication with the clockwise end portion of groove 52. Holes 54 and 55 are counterbored; the inner end of conduit 17 is welded into the counterbored portion of hole 54, and the inner end of conduit 18 is welded into the counterbored portion of hole 55. The outer ends of conduits 17 and 18 are manifolded together and connected to the line 19 which extends to the separation zone 20 (FIG. 1).

The exhaust is from the interior of port ring 30, via groove 52 and holes 54 and 55, to the lines 17 and 18, and thence to separation zone 20.

It is often desired to take a sample of the exhaust gases. The structure to now be described enables this to be accomplished. A very narrow slot (on the order of 20 mils in width, measured parallel to the longitudinal axis of ring 30) 56 is cut (sawed) in tine element 53 on a two-inch radius, centered along the axial dimension of ring 30. The curvature of this slot can be seen, for example, in FIG. 2. The slot 56 serves as a sampling groove, to sample the gases in a very narrow (referring to the axial dimension) area of the interior port ring 30. A radially-extending hole 57 is drilled from the outside of ring 30 into communication with slot 56; the center line of hole 57 extends vertically, as illustrated in FIG. 2. Hole 57 is counterbored, and the inner end of the sampling conduit or line 28 is welded into this counterbore. The outer end of conduit 28 extends to the sample container 29 (FIG. 1). A sample of the exhaust gases is taken from the interior of port ring 30 by means of groove 56, and fed via hole 57 and conduit 28 to the sample container 29.

A disc assembly 58, having an outer diameter such as to fit very closely within ring 30, is mounted for rotation at a high angular velocity (e.g., 9600 r.p.m.) within this ring. If the disc is twelve inches in diameter, this means that the lineal speed at the outer edge of the disc is about 30,000 feet per minute. This disc assembly is mounted for rotation about a horizontal axis which coincides with the longitudinal axis of port ring 30, so that the outer cylindrical surface of the disc rotates just inside the inner cylindrical surface of the stationary port ring. Assuming a clockwise direction of rotation of the disc in FIG. 2, a point on the outer surface of the disc (such as one end of a shock tube carried by the disc) would rotate (during 360° of disc rotation) past the following port ring elements in sequence, starting from a horizontal position: left-hand nozzle 34, recess 38', recess 41', recess 44', groove 52 (and also slot 56), right-hand nozzle 34, recess 38, recess 41, recess 44, and groove 47.

The disc assembly comprises two mating disc portions 58a and 58b, both of circular outer configuration, which are sandwiched together and held in assembled relation by means of an outer series of bolts 59 arranged in a circle, and an inner series of bolts 60 arranged in a circle of smaller diameter (see FIG. 3). Bolts 59 pass through disc portion 58b and thread into tapped holes in disc portion 58a. A squared groove is cut into each of the disc portions 58a and 58b, along a diameter thereof, such that when such two portions are assembled together, a channel of square cross-section is formed by the two squared grooves. Prior to assembly of the two disc portions, a tube 61 of square cross-section (¼-inch by ¼-inch, for example) is fitted closely into this channel, to provide a straight elongated shock tube (close to twelve inches in length) which extends diametrically of the disc assembly. Tube 61 is open at both ends, and the ends of the tube terminate closely adjacent the inner cylindrical surface of the port ring 30, as shown in FIG. 2. The tube 61 extends transversely to the horizontal axis of rotation of the disc assembly, and as the disc rotates in essentially a vertical plane, the ends of the tube 61 come into communication with the various nozzles, recesses, and grooves associated with port ring 30 in the order previously set forth, considering one end of the tube 61 at a time. In FIG. 2, tube 61 is illustrated with its center line in a vertical position, wherein one end of this tube is in communication with groove 52 (and the central area of this one end is in communication with slot 56, see FIG. 3), and the opposite end of this tube is in communication with groove 47. It will be realized, from what has gone before, that the center lines of the various recesses and grooves (and slot) in port ring 30 all lie in a common vertical plane.

For a more detailed description of the construction of disc assembly 58, reference may be made to my copending application, Ser. No. 329,729, filed Dec. 11, 1963, which ripened on Feb. 15, 1966, into Patent No. 3,235,341.

A hollow horizontally-extending shaft 62 (see FIG. 3) is mounted for rotation (by means of suitable bearings, not shown) within a fixed housing 63. Housing 63, which may be cylindrical with its axis extending horizontally, provides a support for the wave reactor, and is attached in turn to a bracket or mount which rests on the floor or other supporting surface. Shaft 62 is rotated at a high rate of speed (e.g., 9600 r.p.m.) by a motor (not shown), through a suitable mechanical coupling (also not shown). The heads of bolts 60 engage an integral collar 64 on one end of shaft 62, and these bolts pass through disc portion 58a and thread into tapped holes in disc portion 58b. Thus, bolts 60, in addition to securing the disc portions 58a and 58b together, couple disc assembly 58 to shaft 62, thereby to cause rotation of disc 58 at the same high rate of speed as shaft 62. The shock tube 61, being rigidly mounted in disc assembly 58, rotates at the same high rate of speed as the disc and shaft 62. It may be seen that the disc 58 rotates essentially in a vertical plane, about the horizontal axis provided by shaft 62. The shock tube 61, of course, rotates in this same plane. A labyrinth seal (a portion of which is illustrated at 65) is used around shaft 62. In addition, other seals (not shown) may be utilized, to enhance the overall sealing around shaft 62.

For pressure measurement purposes, an aperture 66 may be provided in the rear wall of tube 61, centrally of the length thereof, and in this aperture a pressure transducer (not shown) may be inserted, to measure the pressure at the center of the shock tube, as the latter rotates. The transducer is so constructed that it in effect fills in the aperture 66, and forms a continuation of the tube wall, for gas flow in the shock tube. The pressure transducer leads may be taken off through a conduit 67 which extends through the bore of hollow shaft 62 and one end of which threads into a threaded fitting provided at the center of the rear face of disc assembly 58. Conduit 67, and the pressure transducer also, rotate with disc assembly 58.

A rear cover plate 68, which is more or less disc-shaped, is secured to the rear face 32 of port ring 30. Cover plate 68 is attached in any suitable manner to housing 63, in order to provide a support for the principal stationary parts of the wave reactor (such as the port ring, etc.). By way of example, three angularly-extending arms (not shown) may be rigidly secured at their ends to housing 63 and plate 68, respectively. For securing cover plate 68 to port ring 30, a circular array of longitudinally-extending tapped holes 69 is provided in ring 30. Bolts 70 pass through plate 68 and thread into the respective holes 69, to secure rear cover plate 68 to port ring 30. Cover plate 68 has a substantially circular opening at its center, of a diameter such as to clear the rotating collar 64. It is pointed out that the axial dimension of disc assembly 58 is appreciably less than that of port ring 30, so that there is clearance space (for rotation of disc 58) between the front or inner face of cover plate 68 and the rear face of disc 58.

The inner end of housing 63 abuts the rear face of cover plate 68, and a seal ring 71 is used to seal the joint between these two elements. Ring 71 carries in its inner cylindrical surface a gasket 72 (for example, an O-ring) which provides a seal against the outer cylindrical surface of housing 63, and carries in its front circular face a gasket 73 (for example, an O-ring) which provides a seal against the rear face of cover plate 68. Seal ring 71 is held in position by a plurality of bolts 74 which pass therethrough and thread into tapped holes provided in cover plate 68.

To enable visual inspection of the shock tube 61 during operation of the reactor, an aperture 75 is provided in the front wall of tube 61, centrally of the length thereof, and in this aperture there is inserted a stepped inner quartz window 76 which is held in position by a threaded bushing 77, this bushing being threaded into a tapped hole provided in disc assembly 58. The inner step of the window 76 in effect fills in the aperture 75, and forms a continuation of the tube wall, for gas flow in the shock tube. Elements 76 and 77 are carried by the disc assembly 58, and rotate therewith.

A front cover plate 78, which is more or less disc-shaped, is secured to the front face 31 of port ring 30. The tapped holes 69 extend entirely through the port ring body. Bolts 79 pass through plate 78 and threaded into the respective holes 69, to secure front cover plate 78 to port ring 30. Plate 78 has a substantially circular opening at its center, of a diameter such as to clear the central hub of rotating disc assembly 58. Since (as previously stated) the axial dimension of disc assembly 58 is less than that of port ring 30, and since the disc is positioned centrally (in the axial direction) of the port ring, there is clearance space (for rotation of disc 58) between the rear or inner face of cover plate 78 and the front face of disc 58.

A disc-shaped window holder 80 has therein a counterbored central aperture 81 in which is seated an outer quartz window 82. Window holder 80 is secured to the central area of the outer or front face of the stationary cover plate 78 by means of bolts 83 which pass through holder 80 and thread into tapped holes provided in cover plate 78. The center line of window 82 is aligned with the center line of window 76, so that the operator can look from the front of the wave reactor through windows 82 and 76 into the interior of tube 61.

A clamp ring 84 clamps outer window 82 in position against an O-ring seal 85. Clamp ring 84 is secured to window holder 80 by means of bolts 86 which pass through the ring and thread into tapped holes provided in the holder.

Refer again to FIG. 2. A pair of diametrically-opposite vent pipes 87 are sealed through the front cover plate 78, these pipes being centered on a horizontal diameter and being located near the outer periphery of the disc assembly 58. Pipes 87 are welded each to a respective square mounting plate 88 which is in turn secured by bolts 89 to the front cover plate 78. The inner ends of the pipes 87 communicate with the space between the disc 58 and the front cover plate 78, while the outer ends of these pipes vent to the atmosphere. Pipes 87 thus serve to vent the front space inside the housing, which is formed by the cover plates, to the atmosphere.

A pair of vent pipes, similar to pipes 87 but not shown in the drawings, are sealed through the rear cover plate 68, to vent the rear space inside the housing to the atmosphere.

As previously described, the straight open-ended shock tube 61 rotates (in a clockwise direction in FIG. 2) at high angular velocity, essentially in the plane of the paper, about an axis perpendicular to the plane of the paper, the disc rotating within the port ring 30. The ends of the tube 61 thus rotate past the various nozzles, pockets, and grooves associated with the port ring 30, as previously described. As the open ends of the tube 61 rotate past the various nozzles, grooves, and pockets associated with the port ring 30, these ends of course come into communication with such nozzles, grooves, and pockets, in the definite order or succession which was described previously. The action occurring during one complete revolution (360° of rotation) of the disc 58 and the shock tube 61 will now be described. It is pointed out that the ends of tube 61 fit closely (with an extremely small clearance) within the interior of port ring 30.

As one end of the tube 61 comes into communication with groove 47 (by rotating past the counterclockwise end of this groove), process gas begins to flow into this end of the tube, since said groove is coupled to the charge feed lines or conduits 1–4. This flow continues to take place throughout the travel of said one end of the tube past groove 47; by way of example, the latter may have an angular length of 134.5°.

A short time after said one end of the tube first comes into communication with groove 47, continued rotation of disc 58 (and of tube 61) brings the other end of tube 61 into communication with groove 52 (by rotation of said other end of the tube past the counterclockwise end of the groove). Discharging of product gases from a previous operation then commences via groove 52 and lines 17 and 18, a flushing action being produced by the continued intake of process gas or reactant material, as said one end of the tube continues to rotate past groove 47. The discharge or exhaust takes place, of course, via the said other end of the shock tube 61, and continues throughout the travel of said other end of the tube past groove 52.

The clockwise and counterclockwise ends of time element 53 extend, in the radial direction of ring 30, to points which lie very close to the periphery of disc 58 (and to the ends of tube 61). This may be seen in FIGS. 2 and 3. When said other end of tube 61 (during its travel past groove 52) passes the counterclockwise end of tine element 53 (or, more accurately, the counterclockwise end of the arcuate sampling slot 56), the sampling portion of the wave engine cycle begins. The width of slot 56 (measured parallel to the axis of ring 30) is very small compared to the dimension of tube 61 measured parallel to the axis of disc 58. In FIG. 3, the width of slot 56 has been exaggerated for purposes of clarity. Thus, the effect is that, as tube 61 passes slot 56, a centrally-located strip extending across the shock tube 61, and having a very small area, is scanned or sampled by groove 56, and the gaseous sample collected by this groove is fed out via hole 57 and conduit 28 to the sample container 29 (FIG. 1). The sampling takes place, of course, via the said other end of the shock tube 61, and continues throughout the travel of said other end of the tube past sampling slot 56. FIG. 2 illustrates the shock tube 61 in a position wherein its center line extends vertically At this instant, the midpoint of the sampling portion of the wave reactor cycle has been reached. The sampling terminates when said other end of tube 61 passes the clockwise end of tine element 53 (or, more accurately, the clockwise end of sampling slot 56). During the sampling, discharging of product gases continues to take place from those areas of said other end of shock tube 61 which are to the front and rear of tine element 53, and which are exposed to the front and rear sub-grooves 52b and 52a.

After the said other end of tube 61 has passed the clockwise end of groove 52, the exhaust ceases, but reactant material continues to be fed into said one end of the tube, via groove 47, until said one end of the tube passes the clockwise end of groove 47.

Said one end of the shock tube 61 thereafter comes into sudden communication with the interior of the left-hand nozzle 34, and at this same instant said other end of the tube comes into sudden communication with the interior of right-hand nozzle 34. Both ends of the shock tube are thereby suddenly connected to the reservoir 7 of high pressure driving gas (hydrogen). Two shock waves are thereby created, as previously described. The process gas (reactant material) in the tube 61 is thereby compressed and brought very rapidly to the reaction temperature. The adiabatic compression process is completed by the time the ends of the tube have completed their travel past the nozzles 34.

Said one end of the tube thereafter comes into communication with pocket 38', and simultaneously said other end of the tube comes into communication with pocket 38. Pocket 38' communicates with the left-hand line 8, and pocket 38 with the right-hand line 8. Expansion waves are set up, as previously described. The first expansion process is completed by the time the ends of the tube have completed their travel past the clockwise ends of the respective recesses or pockets 38' and 38.

Said one end of the tube thereafter comes into communication with pocket 41', and simultaneously said other end of the tube comes into communication with pocket 41. Pocket 41' communicates with the left-hand line 9, and pocket 41 with the right-hand line 9. Expansion waves are again set up, to begin a second expansion process, which latter is completed by the time the ends of the shock tube 61 have completed their travel past the clockwise ends of the respective recesses or pockets 41' and 41.

Said one end of the shock tube thereafter comes into communication with pocket 44', and simultaneously said other end of the tube comes into communication with pocket 44. Pocket 44' communicates with the left-hand line 10, and pocket 44 with the right-hand line 10. Expansion waves are again set up, to begin a third expansion process, which latter is completed by the time the ends of the tube 61 have completed their travel past the clockwise ends of the respective recesses or pockets 44' and 44. At the end of this third expansion process, all the hydrogen has left the tube.

Said other end of the tube thereafter comes into communication with groove 47, and process gas begins to flow into this end of the tube, this flow continuing to take place throughout the travel of said other end of the tube past the said groove. Shortly after the beginning of this intake into said other end of the tube, said one end of the tube travels past the counterclockwise end of groove 52. Discharging of product gases again commences via groove 52, a flushing action again being produced by the continued intake of process gas or reactant material as said other end of the tube continues to travel past groove 47. The discharge or exhaust now takes place from said one end of tube 61.

During the travel of said one end of tube 61 past groove 52, this end of the tube comes into communication with the sampling slot 56. Sampling of the central portion of said one end of the tube now takes place as it did previously with the other end of the tube, and the sample collected by groove 56 is fed out, as before, to the sample container 29. As stated, the sampling now takes place with respect to the said one end of tube 61.

During the sampling and following the same, discharge and flushing continues, and in fact this continues until said one end of the tube passes the clockwise end of groove 52. Feed of reactant material into said other end of the tube continues after the cessation of exhaust from said one tube end, until said other tube end passes the clockwise end of groove 47.

Said one end of the shock tube 61 thereafter comes into sudden communication with the interior of the right-hand nozzle 34, and at this same instant said other end of the tube comes into sudden communication with the interior of left-hand nozzle 34. Two shock waves are again created, bringing the process gas in the tube rapidly to the reaction temperature.

Said one end of the tube thereafter comes into communication with pocket 38, and simultaneously said other end comes into communication with pocket 38'. A first expansion process again takes place, followed by a second expansion process as said one end of the tube comes into communication with pocket 41 and said other end into communication with pocket 41', and then by a third expansion process as said one end of the tube comes into communication with pocket 44 and said other end into communication with pocket 44'. At the end of this third expansion process, all the hydrogen has left the tube.

Now, the tube 61 has rotated through 360° and the action previously described begins to repeat as said one end of the tube again comes into communication with groove 47. It may be seen that there are actually two intake and two exhaust cycles, and two compression cycles and two expansion cycles, during each 360° of rotation (i.e., during each complete revolution) of the shock tube 61.

The invention claimed is:

1. In a wave reactor, a disc-like rotor having a single straight channel extending transversely to the axis of the rotor and along a diameter of the disc; a stationary port ring closely surrounding said rotor, means providing a pair of diametrically-opposite driving gas inlets in said ring, said ring having therein at least one pair of diametrically-opposite driving gas outlets; said ring also having at one side thereof, in its inner cylindrical surface, a first arcuately-elongated continuous groove and having at the opposite side thereof, in its inner cylindrical surface, a second arcuately-elongated groove; means providing, in the inner cylindrical surface of said ring, a narrow sampling slot which lies entirely within the confines of said first groove and which is substantially isolated from said first groove, said slot having a cross-sectional area small compared to that of said first groove and being located intermediate the ends of said first groove; an outlet conduit sealed into said ring and communicating through said ring with said first groove, and an inlet conduit sealed into said ring and communicating through said ring with said second groove; said rotor being rotatable to bring one end of said channel, during 180° of rotation of said rotor, successively into communication with a driving gas inlet, a driving gas outlet, and said first groove and outlet conduit, said end of said channel also coming into communication with said sampling slot during its time of communication with said first groove, and to bring the other end of said channel, during the same 180° of rotor rotation, successively into communication with a driving gas inlet, a driving gas outlet, and said second groove and inlet conduit.

2. A wave reactor as set forth in claim 1, including also a sample conduit sealed into said ring and communicating through said ring with said sampling slot.

3. A wave reactor as recited in claim 1, wherein said port ring has therein a plurality of pairs of diametrically-opposite driving gas outlets.

4. A wave reactor as recited in claim 1, wherein a plurality of spaced outlet conduits are sealed into said ring and communicate through said ring with said first groove, and wherein a plurality of spaced inlet conduits are sealed into said ring and communicate through said ring with said second groove.

5. A wave reactor as defined in claim 4, including also a sample conduit sealed into said ring and communicating through said ring with said sampling slot.

No references cited.

MORRIS O. WOLK, *Primary Examiner.*

J. H. TAYMAN, *Assistant Examiner.*